US009142957B2

(12) United States Patent
Malmberg et al.

(10) Patent No.: US 9,142,957 B2
(45) Date of Patent: Sep. 22, 2015

(54) CONTROL OF DYNAMIC BUS VOLTAGE IN AN INTERMEDIATE BUS ARCHITECTURE POWER SYSTEM

(75) Inventors: Jonas Malmberg, Färjestaden (SE); Anders Kullman, Kalmar (SE); Fredrik Wahledow, Färjestaden (SE); Henrik Borgengren, Kalmar (SE); Magnus Karlsson, Oskarshamn (SE); Oscar Persson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 13/501,584

(22) PCT Filed: Apr. 20, 2011

(86) PCT No.: PCT/EP2011/056369
§ 371 (c)(1),
(2), (4) Date: Apr. 12, 2012

(87) PCT Pub. No.: WO2012/143050
PCT Pub. Date: Oct. 26, 2012

(65) Prior Publication Data
US 2012/0319504 A1    Dec. 20, 2012

(51) Int. Cl.
*G05F 1/00*    (2006.01)
*H02J 1/08*    (2006.01)
*G06F 1/26*    (2006.01)
*G06F 1/32*    (2006.01)
*H02M 3/158*    (2006.01)
*H02M 1/00*    (2007.01)
*H02M 3/157*    (2006.01)

(52) U.S. Cl.
CPC ... *H02J 1/08* (2013.01); *G06F 1/26* (2013.01); *G06F 1/3253* (2013.01); *H02M 3/158* (2013.01); *H02M 3/157* (2013.01); *H02M 2001/007* (2013.01); *H02M 2001/008* (2013.01); *Y02B 60/1235* (2013.01)

(58) Field of Classification Search
USPC ............ 323/266, 273–277, 283–285; 363/65, 363/71, 123, 124
See application file for complete search history.

(56) References Cited

U.S. PATENT DOCUMENTS

| | | | |
|---|---|---|---|
| 7,673,157 B2* | 3/2010 | Chapuis et al. | 713/300 |
| 2008/0197706 A1* | 8/2008 | Nielsen | 307/66 |
| 2009/0296432 A1* | 12/2009 | Chapuis | 363/65 |
| 2010/0246220 A1* | 9/2010 | Irving et al. | 363/78 |

FOREIGN PATENT DOCUMENTS

| | | | |
|---|---|---|---|
| WO | WO2009/146259 A1 | 12/2009 | |
| WO | WO2010/149205 A1 | 12/2010 | |

* cited by examiner

*Primary Examiner* — Adolf Berhane
*Assistant Examiner* — Gary Nash (57) ABSTRACT

To reduce power loss in an intermediate bus architecture power system, embodiments of the present invention provide an intermediate bus converter which converts an input voltage to an intermediate bus voltage using a converting unit; receives a signal indicative of an output of a converting unit; determines an intermediate bus voltage to reduce power loss in dependence upon the signal indicative of an output of the converting unit; generates a control signal to control the converting unit to convert the input voltage to the determined intermediate bus voltage; and generates an intermediate bus voltage in dependence upon the control signal.

14 Claims, 7 Drawing Sheets

| Output Power (W) | Low output power region 0 – P1 | Middle output power region 0 – P2 | High output power region 0 – P3 |
|---|---|---|---|
| Output Voltage (V) | Set bus voltage to V1 | Set bus voltage to V2 | Set bus voltage to V3 |

Fig. 4a

| Output Power (W) | 0 – 120 | 120 – 160 | 160 – Max |
|---|---|---|---|
| Output Voltage (V) | 7 | 9 | 12 |

| Output Current(A) | Low output current region 0 – I1 | Middle output current region 0 – I2 | High output current region 0 – I3 |
|---|---|---|---|
| Output Voltage (V) | Set bus voltage to V1 | Set bus voltage to V2 | Set bus voltage to V3 |

Fig. 7

CONTROL OF DYNAMIC BUS VOLTAGE IN AN INTERMEDIATE BUS ARCHITECTURE POWER SYSTEM

TECHNICAL FIELD

The present invention relates to the field of Intermediate Bus Architecture (IBA) power systems.

BACKGROUND

Figure 1:
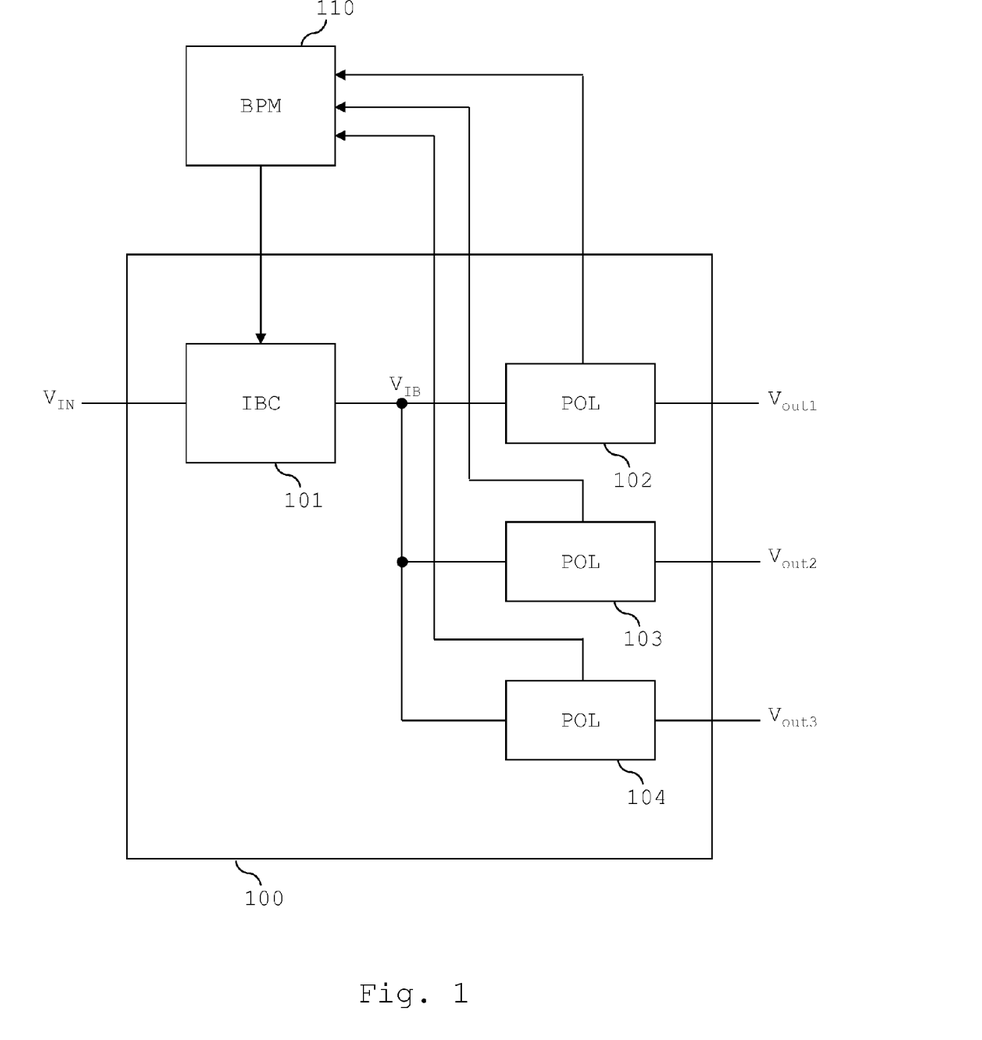
FIG. 1 is a block diagram of a known Intermediate Bus Architecture power system, in which a Board Power Manager instructs the Intermediate Bus Converter to vary the Intermediate Bus Voltage.

Intermediate Bus Architecture (IBA) power systems are well known systems for distributing power. An example Intermediate Bus Architecture system 100 is illustrated in FIG. 1. By way of example, the system shown in FIG. 1 is a pure DC system, and accordingly no AC/DC converters are included in the system.

In such power systems the Intermediate Bus Converter (IBC) 101 delivers a pre-determined voltage to the Point of Load (POL) regulators 102-104 connected to the loads (not shown).

The Intermediate Bus Converter 101 could be one of three general types, namely fixed-ratio DC/DC converter (isolated or non-isolated), line regulated DC/DC converter or fully regulated DC/DC converter. The Intermediate Bus Converter receives an input voltage $V_{in}$ which is typically a DC voltage in one of the ranges of 36-75 V, 18-36 V or 18-60 V.

The Intermediate Bus Converter outputs an Intermediate Bus Voltage ($V_{IB}$) which is used as the input voltage to the Point of Load regulators.

The Point of Load regulators supply the loads in the user system. These Point of Loads are typically non-isolated. It is typical that the Intermediate Bus Converter's and Point of Load Regulators' topology can be any type, namely Buck, Boost, Buck-Boost, etc. isolated or unisolated.

In such a system, the Intermediate Bus Voltage is normally fixed, but with the emerging market of digitally managed Intermediate Bus Converters and Point of Load Regulators there is now a possibility to adjust the Intermediate Bus Voltage to achieve greater efficiencies.

It is also possible to have current sharing between Intermediate Bus Converters and also between Point of Load Regulators. This is achieved using multiple Intermediate Bus Converters and multiple Point of Load Regulators. Information is traded between the different power converters (in the same stage) using Current Sharing Busses (CSBs). There is typically only one such bus in the Intermediate Bus Converter stage. However, in the Point of Load Regulator stage, there can be numerous busses. The Current Sharing Busses are not a part of the invention disclosed herein, but it should be noted that the invention is not conditioned by the presence of Current Sharing Busses.

In a traditional Intermediate Bus Architecture system, the Intermediate Bus Voltage is not regulated for an optimized system efficiency based on the actual load conditions. Instead, the Intermediate Bus Voltage remains fixed independently of the output load.

In order to enable to newer power systems to vary the Intermediate Bus Voltage, it is necessary to include a Board Power Manager (BPM) 110, as shown in FIG. 1. The Board Power Manager accepts measurements from each of the Point of Load Regulators about their respective operating conditions e.g., output current and output voltage, and calculates based on these measurements, the appropriate Intermediate Bus Voltage. The Board Power Manager 110 then instructs the Intermediate Bus Converter, via a Power Management Bus, to either raise or lower its output voltage, and hence raise or lower the Intermediate Bus Voltage, for maximised efficiency.

However, this scheme suffers from a number of problems. For example, it is necessary to have a Board Power Manager that has been programmed with an algorithm that controls the output voltage by communication to the Intermediate Bus Converter. This Board Power Manager adds to the purchase cost of the system, and also adds to maintenance requirements of the system. In addition, the Board Power Manager 110 makes the system more complex since the Board Power Manager needs to collect data from the Point of Load Regulators before adjusting the output voltage from the Intermediate Bus Converter.

In view of the problems in known dynamic Intermediate Bus Voltage power systems, it would be desirable to provide an apparatus and method for controlling the Intermediate Bus Voltage so as to simplify maintenance and operation of the power system whilst still providing maximal power efficiency.

SUMMARY

The present inventors have found that an Intermediate Bus Voltage to reduce power loss can be determined without collecting information from the Point of Load regulators, by utilising information available within the Intermediate Bus Converter. By exploiting this finding, the inventors have devised an apparatus and method for dynamically controlling the Intermediate Bus Voltage without requiring the use of a Board Power Manager.

According to the present invention there is provided an Intermediate Bus Converter operable to generate an Intermediate Bus Voltage for use in an intermediate bus architecture power system. The Intermediate Bus Converter comprises a converting unit and controlling unit. The converting unit is operable to receive an input voltage and a control signal and is operable to generate an Intermediate Bus Voltage based on the input voltage and the control signal. The controlling unit is operable to receive a signal indicative of an output of the converting unit, determine an Intermediate Bus Voltage to reduce power loss in dependence upon the signal indicative of the output of the converting unit, and generate a control signal for controlling the converting unit to generate the determined Intermediate Bus Voltage.

Moreover, the present invention also provides a control method of controlling the Intermediate Bus Voltage in an intermediate bus architecture power system, the method comprising an Intermediate Bus Converter within the intermediate bus architecture power system performing operations of: converting an input voltage to an Intermediate Bus Voltage using a converting unit; receiving a signal indicative of an output of a converting unit; determining an Intermediate Bus Voltage to reduce power loss in dependence upon the signal indicative of an output of the converting unit; generating a control signal to control the converting unit to convert the input voltage to the determined Intermediate Bus Voltage; and generating an Intermediate Bus Voltage in dependence upon the control signal.

As a result of these features the Intermediate Bus Converter itself determines an Intermediate Bus Voltage to reduce power loss and performs voltage control to achieve the determined Intermediate Bus Voltage. Consequently, a Board Power Manager is not required, and the cost of maintenance is reduced. In addition, in embodiments of the present invention the Intermediate Bus Converter may be reprogrammed by a user according to their specific requirements.

BRIEF DESCRIPTION OF THE DRAWINGS

Embodiments of the invention will now be described, by way of example only, with reference to the accompanying drawings in which.

DETAILED DESCRIPTION OF EMBODIMENTS

As will be explained in detail below, the present invention proposes an Intermediate Bus Converter for use in an intermediate bus architecture that simplifies the construction and maintenance of the intermediate bus architecture whilst providing improved power efficiency.

Figure 2:
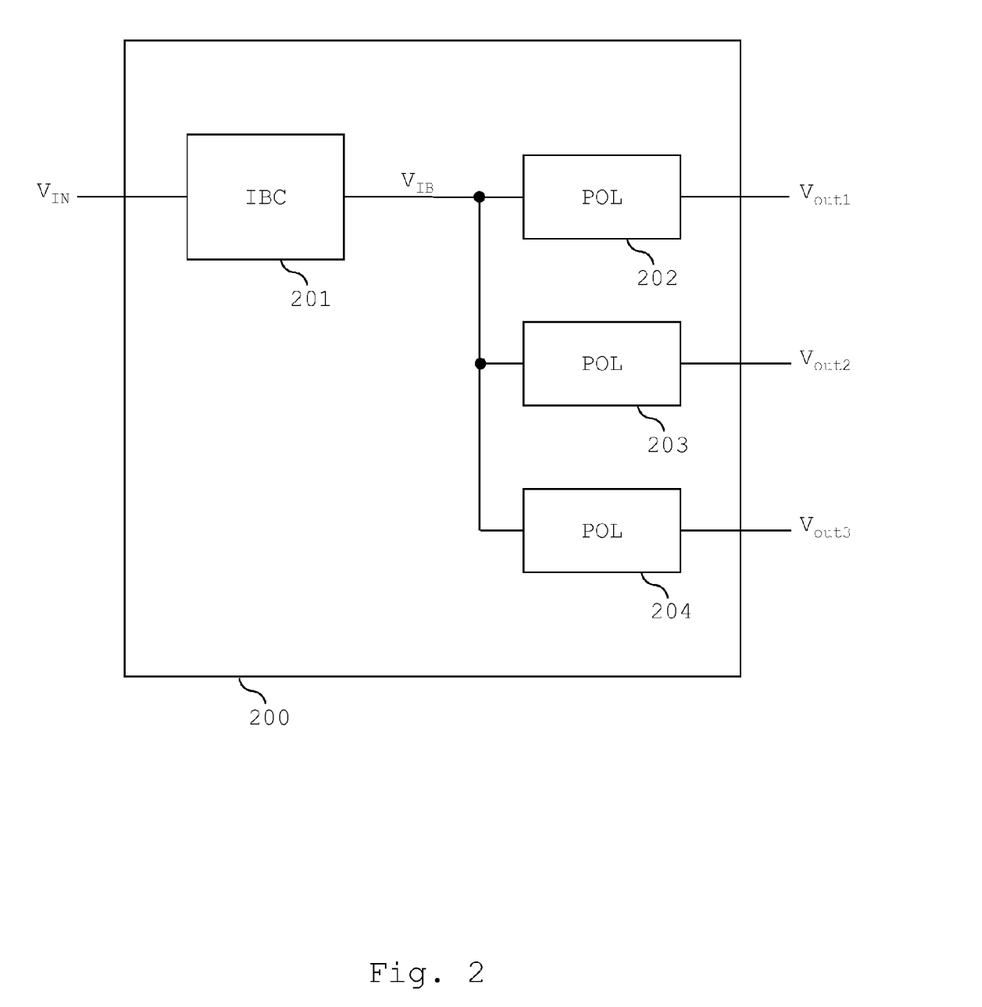
FIG. 2 is a block diagram showing an Intermediate Bus Architecture power system with an Intermediate Bus Converter according to a first embodiment of the present invention.

FIG. 2 depicts a top-level block diagram of an intermediate bus architecture 200 power system in accordance with a first embodiment.

Referring to FIG. 2, the Intermediate Bus Converter 201 is fed with an input voltage $V_{IN}$ which is then converted to an Intermediate Bus Voltage. The Intermediate Bus Voltage is then fed into a number of Point of Load regulators 202-204 which convert the Intermediate Bus Voltage into a plurality of output voltages $V_{out1}$-$V_{out3}$ which are applied to external loads (not shown).

In this embodiment of the present invention, it is not necessary to use a Board Power Manager (as depicted in FIG. 1) because, as will be explained in detail below, it is the Intermediate Bus Converter itself that takes the appropriate measurements, calculates an Intermediate Bus Voltage to reduce power loss and then adjusts its output accordingly.

Figure 3:
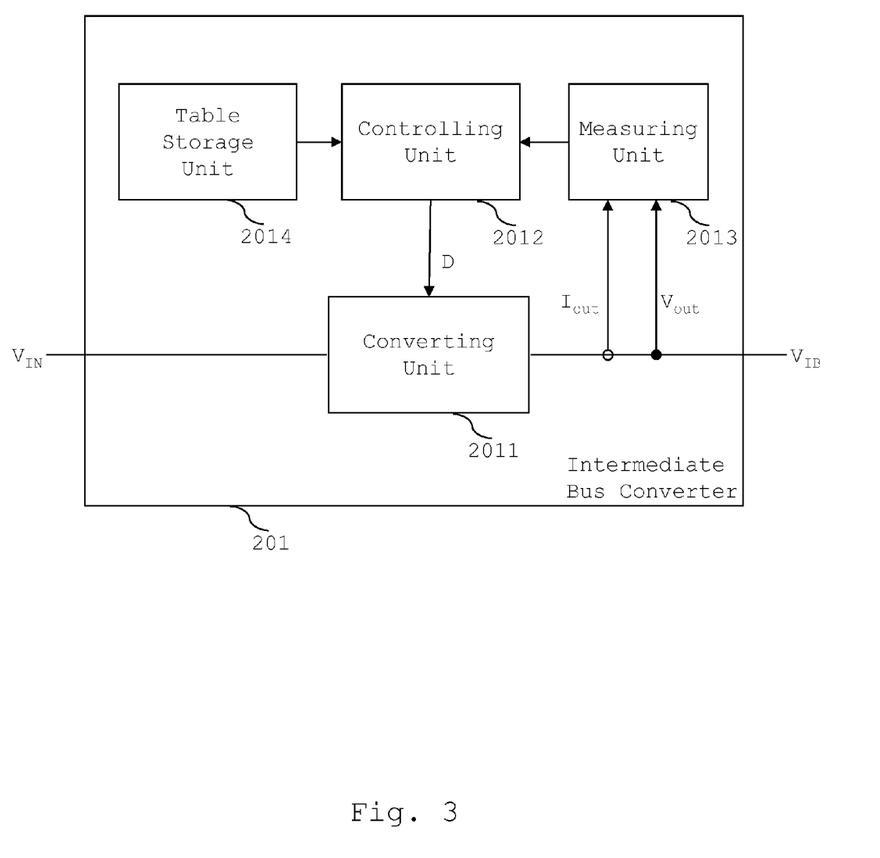
FIG. 3 is a block diagram showing further detail of the Intermediate Bus Converter according to the first embodiment of the present invention.

FIG. 3 depicts a more detailed layout of the Intermediate Bus Converter 201 according to the first embodiment of the present invention. In this embodiment, the Intermediate Bus Converter 201 comprises a converting unit 2011 and a controlling unit 2012. In addition, the two optional elements, namely measuring unit 2013 and table storage unit 2014 are also provided in this embodiment.

The converting unit 2011 is operable to receive an input voltage $V_{IN}$ and a control signal D and is operable to generate an Intermediate Bus Voltage based on the input voltage $V_{IN}$ and the control signal D.

The controlling unit 2011 is operable to receive a signal indicative of an output of the converting unit 2011, determine an Intermediate Bus Voltage to reduce power loss in dependence upon the signal indicative of the output of the converting unit 2011, and generate the control signal D for controlling the converting unit 2011 to generate the determined Intermediate Bus Voltage.

The optional measuring unit 2013 is operable to measure an output of the converting unit 2011 on the intermediate bus and is operable to generate the signal indicative of the output of the converting unit 2011. In the present embodiment, the measuring unit 2013 is arranged to measure both the output current $I_{out}$ and the output voltage $V_{out}$ of the Intermediate Bus Converter 201 and generate signals indicative of these outputs, although this is not essential, as explained later. If a measuring unit 2013 is not provided, then the outputs of the converting unit 2011 may be fed directly into the controlling unit 2012. The controlling unit 2012 can then use the outputs of the converting unit 2011 to determine the Intermediate Bus Voltage to reduce power loss.

In this embodiment, the controlling unit 2011 is operable to calculate an output power of the Intermediate Bus Converter 201 in dependence upon the signal indicative of the output current of the converting unit 2011 and in dependence upon the signal indicative of the output voltage of the converting unit 2011. The controlling unit 2011 then determines an Intermediate Bus Voltage to reduce power loss in dependence upon the calculated output power.

As a result, this embodiment of the present invention provides an apparatus that allows the controlled variation of the Intermediate Bus Voltage without any external communication to the Point of Load Regulators, removing the need for a Board Power Manager.

In this embodiment, the controlling unit is arranged to determine an Intermediate Bus Voltage to reduce power loss using a look-up table stored in the table storage unit 2014. The content of the table may be set during manufacturing and changed, if required, using the Power Management Bus for communication. The content of the table in effect defines the rules for Intermediate Bus Voltage change.

More particularly, the table storage unit 2014 is configured to store a table relating respective outputs of the converting unit 2011 to respective Intermediate Bus Voltages which reduce power loss. The controlling unit is then operable to determine the Intermediate Bus Voltage to reduce power loss by reading an Intermediate Bus Voltage from the stored table in dependence upon the signal indicative of the output of the converting unit 2011.

Figure 4A:
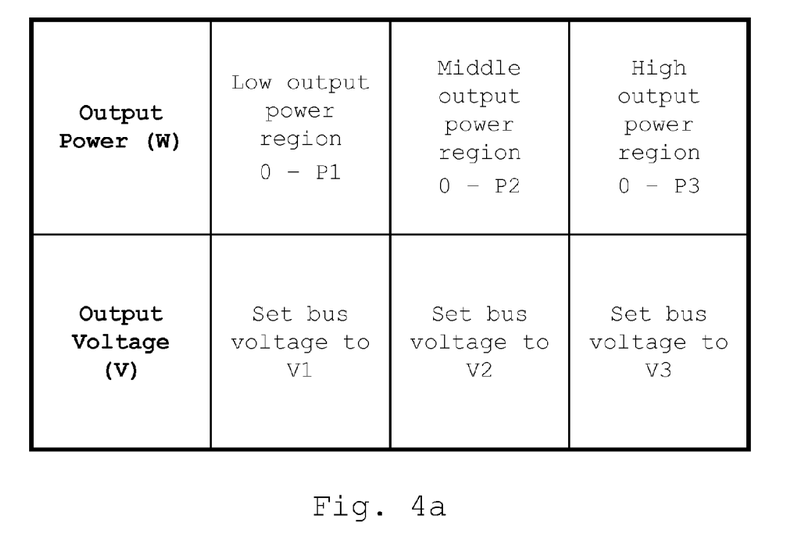
FIG. 4a is a generalised table, stored in the table storage unit of FIG. 3, relating output power to output voltage.

FIG. 4a shows a generalised table, stored in the table storage unit of FIG. 3, relating respective output powers of the converting unit 2011 to output voltages (Intermediate Bus Voltages).

Figure 4B:
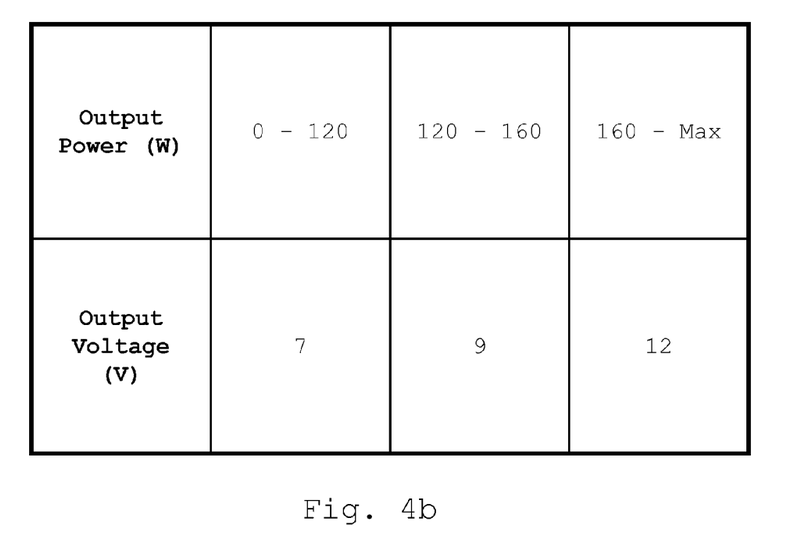
FIG. 4b is an exemplary table, stored in the table storage unit of FIG. 3, relating output power to output voltage.

By way of example, FIG. 4b shows an exemplary table, stored in the table storage unit of FIG. 3, with exemplary real world values relating respective output powers of the converting unit 2011 to output voltages (Intermediate Bus Voltages). The table shows how the output voltage of the Intermediate Bus Converter should be changed over various power ranges, as calculated by the controlling unit 2012.

Accordingly, when controlling unit 2012 calculates an output power of the converting unit 2011 to be in the range 0-120 W, then the controlling unit 2012 determines from the table that the output voltage of the converting unit 2011 (Intermediate Bus Voltage) that would reduce power loss should be 7V. Thereby, the controlling unit 2012 generates a control signal D to control the converting unit 2011 to set the output voltage to 7V. Similarly, if the calculated output power of the converting unit is in the range 120 W-160 W then the controlling unit 2012 determines that the output voltage of the converting unit 2011 to reduce power loss is 9V. If the calculated power is in the range 160 W-MAX then the controlling unit 2012 determines that the output voltage of the converting unit 2011 should be 12V. It will be appreciated that these values are merely exemplary and appropriate values of the power and output voltage can be set in a table at manufacture and by the user during operation according to the desired use.

From the above, it will therefore be understood that the output voltage change is based on output current received by the controlling unit 2011 integrated in DC/DC Intermediate Bus Converter. This function is configured as a hex decimal block in manufacturing command registers and is in linear format.

The present embodiment of the invention allows the output power to be measured internally with the digital control circuit on the Intermediate Bus Converter, instead of obtaining information from the Point of Load Regulators. This permits the removal of the Board Power Manager.

Since the dynamic Intermediate Bus Voltage is controlled by a table, it operates in a similar fashion to a state machine and can be configured to be turned ON or OFF. As a result, changes are fast, creating less noise in the Intermediate Bus Voltage. In addition, this dynamic Intermediate Bus Voltage function will not affect other functions such as current limiting, current sharing etc.

This present embodiment of the invention, due to the use of digital control, allows a configurable slew rate of the output voltage when changing the bus voltage. This is important since it allows the control of the inrush current and current sink, and permits a stable change when using active current sharing and not affecting the output voltage of the Point of Load Regulator with sudden voltage steps.

The controlling unit 2012 could also work as a master to communicate with other PMBus devices and use information from Point of Load Regulators to make decisions how to change the output voltage.

A change in the system loading, i.e. the power that the Intermediate Bus Voltage is required to supply, may result in a change of the Intermediate Bus Voltage. If the load increases, then this can cause the Intermediate Bus Voltage to increase.

The controlling unit 2012 would typically be configured to continuously monitor the signal indicative of the output voltage and/or the signal indicative of the output current of the converting unit 2011 and change the Intermediate Bus Voltage whenever the controlling unit 2012 detects a significant change in the load.

For example, if the controlling unit 2012 detects that the load has increased, then the controlling unit 2012 would increase the Intermediate Bus Voltage and thereby prevent the Intermediate Bus Voltage from limiting the maximum output power.

Typically, the controlling unit 2012 would be capable of changing the Intermediate Bus Voltage one hundred to a thousand times per second.

The determination of whether the Intermediate Bus Voltage should be changed may use thresholds to avoid the effects of noise. For example, the Intermediate Bus Voltage may only be changed when the monitored output voltage is more than a few hundred millivolts.

Using new technologies such as digitally controlled and digitally managed Intermediate Bus Converters and Point of Load Regulators there will be more information available in the power system. This information includes information such as momentary input and output currents, input and output voltages, and duty cycle of the Point of Load Regulators and the Intermediate Bus Converters.

Dynamic control of the Intermediate Bus Voltage can occur soon after the power system is powered on. After ramp up, which means that the power system has received a "power system initialization completed and successful" signal (which, for example, can be "Power Good received") then a measurement of output current is performed and an output voltage is set through the table configuration.

Figure 5:
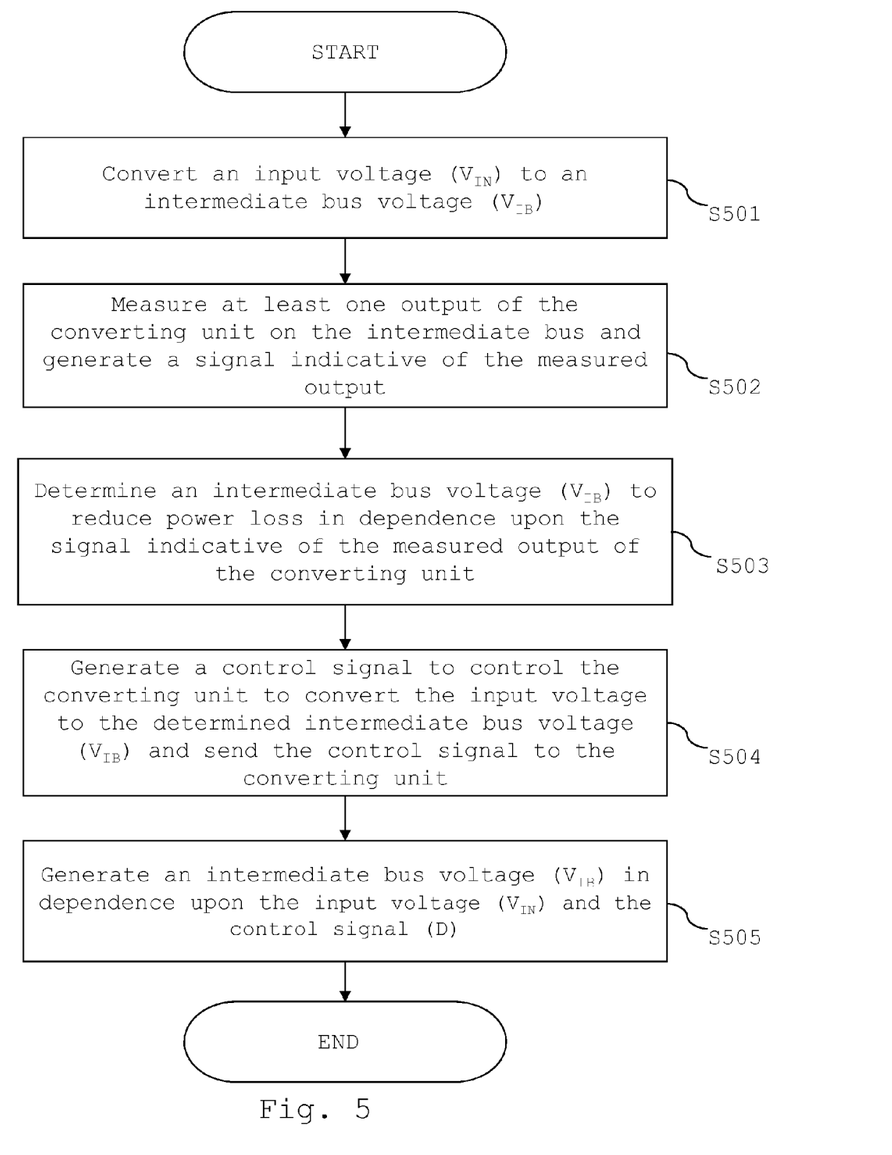
FIG. 5 is a flowchart showing the processes performed by the components of the Intermediate Bus Converter of FIG. 3.

FIG. 5 shows a flowchart of the processing operations performed by the Intermediate Bus Converter 201 of FIG. 3 to control the Intermediate Bus Voltage in an intermediate bus architecture 200 power system.

Referring to FIG. 5, at step S501 an input voltage $V_{in}$ is converted to an Intermediate Bus Voltage by the converting unit 2011.

At step S502 at least one output on the intermediate bus is measured and used to generate a signal indicate of the measured output. In the present embodiment, the outputs of the Intermediate Bus Converter 201 that are measured are the output current $I_{out}$ and the output voltage $V_{out}$ of the converting unit 2011.

At step S503 an Intermediate Bus Voltage to reduce power loss is determined in dependence upon the signal indicative of the measured output of the converting unit 2011. In the present embodiment, an output power of an Intermediate Bus Converter 201 is calculated in dependence upon the signal indicative of an output current $I_{out}$ of the converting unit 2011 and in dependence upon the signal indicative of an output voltage $V_{out}$ of the converting unit (2011). An Intermediate Bus Voltage to reduce power loss is determined in dependence upon this calculated output power.

At step S504 a control signal D is generated to control the converting unit 2011 to convert the input voltage to the determined Intermediate Bus Voltage. This control signal D is then sent to the converting unit 2011.

At step S505 an Intermediate Bus Voltage is generated by the converting unit 2011 in dependence upon the input voltage $V_{IN}$ and the control signal D.

FIG. 5 shows a single set of processing operations from measuring at least one output of the converting unit 2011 to generating an Intermediate Bus Voltage. The single set of processing operations is shown to end after step S505.

However, as described earlier, controlling unit 2012 would typically continuously monitor at least one output of the converting unit 2011 and determine if the Intermediate Bus Voltage should be changed. For such an arrangement, the processing operations would not end after step S505 but loop back to step S501 so that the processing operations are repeated endlessly.

EXPERIMENTAL RESULTS

Figure 6:
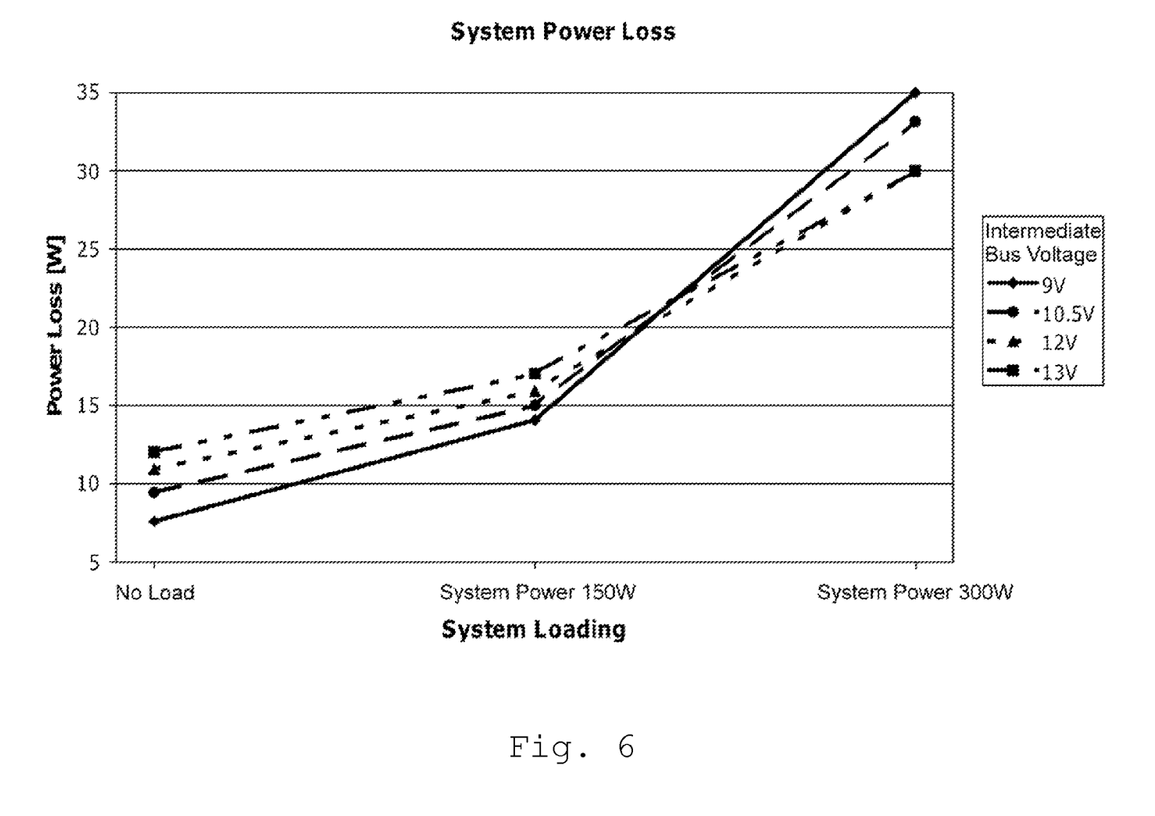
FIG. 6 shows experimental results for an embodiment from a test comparison comparing the system power loss for varying loads between 0 W and 300 W for varying Intermediate Bus Voltages 9V-13V.

FIG. 6 depicts experimental results for an embodiment of the invention showing how the power losses vary according to system loading for various Intermediate Bus Voltages.

As can be seen in the graph, for no load then a voltage of 9V is best, since this minimises power losses. However, for loads greater than 150 W load, a crossover point occurs and it is more advantageous to use an Intermediate Bus Voltage of 12V.

[Modifications and Variants]

Many modifications and variations can be made to the embodiments described above, without departing from the scope of the present invention.

For example, it is not necessary for the measuring unit 2013 and the controlling unit 2012 (depicted in FIG. 3) to be separate units. Instead, the measuring unit 2013 and the controlling unit 2012 may be formed as an integral unit.

Figure 7:
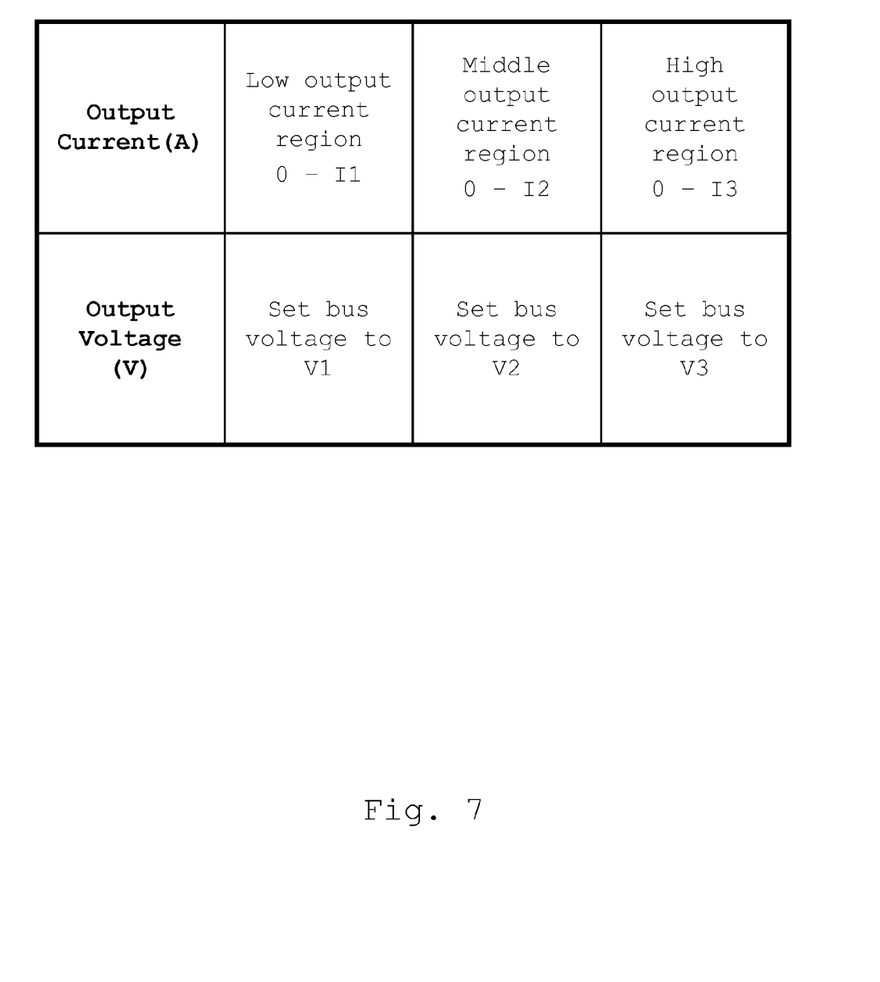
FIG. 7 is a generalised table, stored in the table storage unit of FIG. 3 in a modified embodiment, relating output current to output voltage.

Although the output current and output voltage of the Intermediate Bus Converter are measured (in order to calculate an output power) in the embodiment above, it is not necessary to measure and utilise both of these outputs, and instead only one output may be measured and utilised. For example, an embodiment may measure and utilise the output current of the Intermediate Bus Converter, alone. A table based upon the output current can then be used to determine an Intermediate Bus Voltage to reduce power loss. An exemplary version of this table is depicted in FIG. 7.

Optionally, it is possible for the controlling unit 2011 to use an algorithm, instead of a table, to calculate the Intermediate Bus Voltage to reduce power loss by executing the algorithm. The controlling unit 2011 may thereby generate a control signal to instruct the converting unit 2011 to change its output voltage based the result of executing the algorithm.

Exemplary algorithms are shown below in Equations 1 and 2.

$$V_{IB} = k_1 \times P_{out} + m_1 \quad \text{(Equation 1)}$$

$$V_{IB} = k_2 \times P_{out}^2 + m_2 \quad \text{(Equation 2)}$$

In these equations $V_{IB}$ is the Intermediate Bus Voltage output from the Intermediate Bus Converter, $P_{out}$ is the measured output power from the Intermediate Bus Converter, k is the gain factor and m is the offset.

In a real-world scenario, the constants may be: $k_1=3.2E-5$, $m_1=7$, $k_2=0.127$ and $m_2=7$.

These equations permit the calculation of the Intermediate Bus Voltage to reduce power loss without the use of a table.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. An intermediate bus converter operable to generate an intermediate bus voltage ($V_{IB}$) for use in an intermediate bus architecture power system having a plurality of point of load regulators, the intermediate bus converter comprising:
   a converting unit operable to receive an input voltage ($V_{IN}$) and a control signal (D) and operable to generate an intermediate bus voltage ($V_{IB}$) based on the input voltage ($V_{IN}$) and the control signal (D);
   a table storage unit configured to store a table relating respective outputs of the converting unit to respective intermediate bus voltages which reduce power loss; and
   a controlling unit operable to receive a signal available within the intermediate bus converter indicative of an output of the converting unit, determine an intermediate bus voltage ($V_{IB}$) to reduce power loss in dependence upon the signal indicative of the output of the converting unit, and generate a control signal (D) for controlling the converting unit to generate the determined intermediate bus voltage ($V_{IB}$) so that the intermediate bus converter determines an intermediate bus voltage to reduce power loss and performs voltage control to achieve the determined intermediate bus voltage without receiving output current and output voltage measurements from the point of load regulators,
   wherein the controlling unit is operable to determine the intermediate bus voltage (VIB) to reduce power loss by reading an intermediate bus voltage (VIB) from the stored table in dependence upon the signal indicative of the output of the converting unit.

2. The intermediate bus converter according to claim 1, further comprising:
   a measuring unit operable to measure an output of the converting unit and operable to generate the signal indicative of the output of the converting unit.

3. The intermediate bus converter according to claim 2, wherein the measuring unit is operable to measure the output current ($I_{out}$) on the intermediate bus.

4. The intermediate bus converter according to claim 2, wherein the measuring unit is operable to measure the output voltage ($V_{out}$) on the intermediate bus.

5. The intermediate bus converter according to claim 3, wherein the controlling unit is operable to calculate an output power of the intermediate bus converter in dependence upon the output current of the converting unit and in dependence upon the output voltage of the converting unit, and wherein the controlling unit is operable to determine the intermediate bus voltage ($V_{IB}$) to reduce power loss in dependence upon the calculated output power.

6. The intermediate bus converter according to claim 5, wherein the controlling unit is operable to detect a change in the calculated output power of the intermediate bus converter and to determine the intermediate bus voltage ($V_{IB}$) in dependence upon the detected change in the calculated output power.

7. The intermediate bus converter according to claim 2, wherein the controlling unit and the measuring unit are formed as an integral unit.

8. The intermediate bus architecture power system comprising:
   an intermediate bus converter according to claim 1;
   a plurality of point of load regulators arranged to receive the intermediate bus voltage generated by the intermediate bus converter, wherein the intermediate bus architecture power system does not have a board power manager.

9. A control method of controlling the intermediate bus voltage ($V_{IB}$) in an intermediate bus architecture power system comprising an intermediate bus converter and a plurality of point of load regulators without the use of a board power manager, the method comprising the intermediate bus converter performing operations of:
   converting an input voltage ($V_{IN}$) to an intermediate bus voltage using a converting unit;
   receiving a signal available within the intermediate bus converter indicative of an output of the converting unit;
   determining an intermediate bus voltage ($V_{IB}$) to reduce power loss in dependence upon the signal indicative of an output of the converting unit, wherein the intermediate bus voltage (VIB) to reduce power loss is determined by reading a value from a stored table relating respective outputs of the converting unit to respective intermediate bus voltages (VIB) which reduce power loss, in dependence upon the signal indicative of the output of the converting unit;
   generating a control signal (D) to control the converting unit to convert the input voltage ($V_{IN}$) to the determined intermediate bus voltage; and
   generating an intermediate bus voltage ($V_{IB}$) in dependence upon the control signal so that the intermediate bus converter determines an intermediate bus voltage to reduce power loss and performs voltage control to achieve the determined intermediate bus voltage without receiving output current and output voltage measurements from the point of load regulators.

10. The control method according to claim 9, wherein:
   the method further comprises, measuring an output of the converting unit; and
   the signal indicative of an output of the converting unit is generated in dependence upon the measured output.

11. The control method according to claim 10, wherein an output current ($I_{out}$) on the intermediate bus is measured.

12. The control method according to claim 10, wherein an output voltage ($V_{out}$) on the intermediate bus is measured.

13. The control method according to claim 12, wherein:
   the method further comprises, calculating an output power of the intermediate bus converter in dependence upon the output current ($I_{out}$) of the converting unit and in dependence upon the output voltage ($V_{out}$) of the converting unit; and
   the intermediate bus voltage ($V_{IB}$) to reduce power loss is determined in dependence upon the calculated output power.

14. The control method according to claim 13, wherein:
   the method further comprises detecting a change in the calculated output power of the intermediate bus converter; and
   the intermediate bus voltage ($V_{IB}$) is determined in dependence upon the detected change in the calculated output power.

* * * * *